United States Patent
Kim et al.

(10) Patent No.: US 9,642,217 B2
(45) Date of Patent: May 2, 2017

(54) INFRARED COMMUNICATION SENSOR AND MOTION SENSOR NETWORK SYSTEM AND METHOD FOR LIGHTING IN GROUP UNITS BY USING SAME

(71) Applicant: JPK KOREA CO., LTD., Seoul (KR)

(72) Inventors: Seok Tae Kim, Suwon (KR); Jong Min Park, Seoul (KR); Hong Min Lee, Bucheon (KR); June Shik Kim, Yongin (KR)

(73) Assignee: JPK KOREA CO., LTD., Seoul (KR)

( * ) Notice: Subject to any disclaimer, the term of this patent is extended or adjusted under 35 U.S.C. 154(b) by 0 days.

(21) Appl. No.: 14/439,708

(22) PCT Filed: May 30, 2014

(86) PCT No.: PCT/KR2014/004827
§ 371 (c)(1),
(2) Date: Apr. 30, 2015

(87) PCT Pub. No.: WO2014/193184
PCT Pub. Date: Dec. 4, 2014

(65) Prior Publication Data
US 2016/0174333 A1    Jun. 16, 2016

(30) Foreign Application Priority Data

May 30, 2013    (KR) .......................... 10-2013-0061889

(51) Int. Cl.
*H05B 37/02*    (2006.01)
*H05B 39/04*    (2006.01)
(Continued)

(52) U.S. Cl.
CPC ........ *H05B 37/0227* (2013.01); *G01J 1/4204* (2013.01); *H04L 12/6418* (2013.01);
(Continued)

(58) Field of Classification Search
None
See application file for complete search history.

(56) References Cited

U.S. PATENT DOCUMENTS

2010/0327766 A1*  12/2010  Recker ................... H02J 9/02
                                                       315/291
2012/0206051 A1*   8/2012  Nieuwlands ....... H05B 37/0227
                                                       315/153

FOREIGN PATENT DOCUMENTS

CN    102388678    3/2012
JP    02-067837    3/1990
(Continued)

OTHER PUBLICATIONS

JPO, Notice of Reasons for Rejection of Application No. 2015-546406, Jun. 27, 2016.
(Continued)

*Primary Examiner* — Anh Tran
(74) *Attorney, Agent, or Firm* — Lex IP Meister, PLLC (57) ABSTRACT

A motion sensor network method for lighting in group units by using an infrared communication sensor according to the present invention comprises the steps of: sensing a first motion of a person or a vehicle by means of a first sensor module and turning on one lighting module; implementing infrared communication with another sensor module adjacent to the first sensor module and turning on another lighting module; maintaining the turning-on of the first lighting module and the other lighting module when the first sensor module or the other sensor module senses a second motion of the person or the vehicle; and turning off the first lighting module and the other lighting module when the first sensor module or the other sensor module fails to sense the second motion of the person or the vehicle for a certain time.

4 Claims, 8 Drawing Sheets

(51) Int. Cl.
  *H05B 41/36* (2006.01)
  *H04L 12/64* (2006.01)
  *G01J 1/42* (2006.01)
  *H04L 29/08* (2006.01)

(52) U.S. Cl.
  CPC ......... *H04L 67/12* (2013.01); *H05B 37/0272* (2013.01); *H05B 37/0281* (2013.01)

(56) References Cited

FOREIGN PATENT DOCUMENTS

| | | |
|---|---|---|
| JP | 11-008625 | 1/1999 |
| JP | 2001-210476 | 8/2001 |
| JP | 2003-133083 | 5/2003 |
| JP | 2009-238527 | 10/2009 |
| JP | 2009-259584 | 11/2009 |
| KR | 10-0776804 | 11/2007 |
| KR | 10-2011-0136897 | 12/2011 |
| KR | 10-2012-0080442 | 7/2012 |

OTHER PUBLICATIONS

SIPO, First Office Action of Application No. 201480003064.5, Mar. 21, 2016.

\* cited by examiner

◆ TURN ON GREEN LED UPON DETECTING OBJECT

EX) LIGHTING BRIGHTNESS 20% OF NON-DETECTION OF GROUP MOTION

◆ TURN ON BLUE LED UPON DETECTING OBJECT

EX) LIGHTING BRIGHTNESS 100% OF DETECTION OF GROUP CAR MOTION

INFRARED COMMUNICATION SENSOR AND MOTION SENSOR NETWORK SYSTEM AND METHOD FOR LIGHTING IN GROUP UNITS BY USING SAME

TECHNICAL FIELD

The present invention relates to an infrared communication sensor, and a motion sensor network system and method for controlling a lighting module in group units using the infrared communication sensor, and more particularly, a sensor module, a sensor network system and method, for controlling an operation of a lighting module in group units through wireless communication between sensor modules such that a one-side sensor module of a plurality of sensor modules controls an on-operation of a corresponding lighting module upon receiving an infrared signal from a neighboring sensor module or detecting a motion of a man and so on through a motion sensor of the one-side sensor module and is maintained to be turned on upon receiving an infrared signal from a neighboring sensor module or re-detecting a motion of a man through a motion sensor of the one-side sensor module.

BACKGROUND ART

In general, in order to reduce unnecessary waste of energy, when there is no motion of a man, a car, and so on, a lighting apparatus is turned off, and when a motion of a man and so on is detected, the lighting apparatus is automatically turned on under a predetermined illuminance condition.

In the case of a parking lot, a plurality of lighting apparatuses is configured in such a way that a sensor is attached to each lighting apparatus to detect whether a man or a car is present. There is a limit to a distance for detection of a motion of a man or a car through a sensor. Accordingly, only a lighting apparatus around which a man and so on are present is operated such that a portion of the parking lot is light and another portion is dark, and thus a lighting function is not substantially achieved.

However, it is not necessary to operate all lighting apparatuses in a parking lot. Accordingly, there is a need to control an operation of only a lighting apparatus for detection of a motion within a required range.

DISCLOSURE

Technical Problem

An object of the present invention devised to solve the problem lies in an infrared communication sensor module for turning on/off a plurality of lighting apparatuses in group units.

Another object of the present invention devised to solve the problem lies in a motion sensor network system and method for lighting in group units using an infrared communication sensor, for controlling motion sensors in relay or simultaneously when a man or a vehicle is detected by a neighboring motion sensor as well as when a man or a car is detected by a motion sensor of the communication sensor.

Another object of the present invention devised to solve the problem lies in a motion sensor network system and method for lighting in group units using an infrared communication sensor, for adjusting an angle of a sensor to ensure a maximum motion detection distance of a man or a vehicle and for installing an infrared LED to be tilted so as to allow infrared communication between sensors irrespective of an angle of a tilted sensor.

Another object of the present invention devised to solve the problem lies in a motion sensor network system and method for lighting in group units using an infrared communication sensor, for remotely controlling a sensor via a non-contact method to set a group unit or to arbitrarily change the group unit.

Technical Solution

The object of the present invention can be achieved by providing a motion sensor network system for lighting in group units using an infrared communication sensor, including a plurality of lighting modules, a plurality of sensor modules corresponding to the respective lighting modules and for controlling an on/off operation of the lighting modules, wherein the sensor modules control operations of the lighting modules through wireless communication between the sensor modules in group units, and a group unit includes at least two lighting modules.

In another aspect of the present invention, provided herein is an infrared communication sensor including a PCB, a motion sensor on the PCB, a pair of wireless transceivers on the PCB, and a pair of wireless receivers on the PCB.

In another aspect of the present invention, provided herein is a motion sensor network method for lighting in group units using an infrared communication sensor, the method including detecting a first motion of a man or a car and turning on a one-side lighting module by a one-side sensor module, performing infrared communication with an another-side sensor module that neighbors the one-side sensor module and turning on an another-side lighting module, maintaining an on-operation of the one-side lighting module and the another-side lighting module upon detecting a second motion of a man or a car by the one-side sensor module or the another-side sensor module, and turning off the one-side lighting module and the another-side lighting module when the second motion of the man or the car is not detected for predetermined time by the one-side sensor module or the another-side sensor module.

Advantageous Effects

As described above, the following advantageous effects may be expected according to configuration of embodiments of the present invention.

First, a plurality of lightings is turned on or off in group units in relay or simultaneously, it is easy to control lightings.

Second, an infrared signal is encoded and encrypted to easily set or change a group unit so as to appropriately correspond a lighting environment.

Third, a sensor module is remotely controlled through local area communication, and thus it is easy to control a lighting installed on the ceiling, to which approach is difficult.

BEST MODE

The attached drawings for illustrating exemplary embodiments of the present invention are referred to in order to gain a sufficient understanding of the present invention, the merits thereof, and the objectives accomplished by the implementation of the present invention. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. Meanwhile, the terminology used herein is for the purpose of describing particular embodiments and is not intended to limit the invention. In the drawings, the size and relative size of layers and regions are exaggerated for clarity. Throughout this specification, the same elements are denoted by the same reference numerals.

Hereinafter, an infrared communication sensor module and a motion sensor network system for lighting in group units using the infrared communication sensor module will be described according to exemplary embodiments of the invention with reference to the attached drawings.

Figure 1:
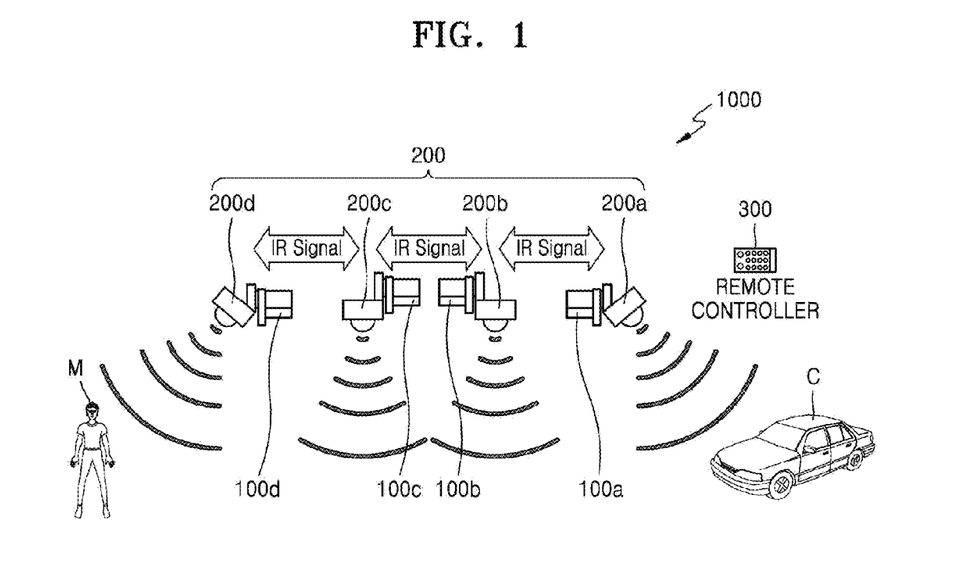
FIG. 1 is a block diagram illustrating a motion sensor network system for lighting in group units using an infrared communication sensor according to an embodiment of the present invention.

Referring to FIG. 1, a motion sensor network system 1000 for lighting in group units using an infrared communication sensor may include at least one lighting module 100, a plurality sensor modules 200 for controlling an operation of the lighting module 100 by wire or wirelessly according to one to one or one to multi correspondence to the lighting module 100, and a remote controller 300 for remotely controlling the sensor module 200.

The lighting module 100 may include a first lighting module 100a to a fourth lighting module 100d. The sensor module 200 may constitute a group including a first sensor module 200a to a fourth sensor module 200d. Accordingly, a group unit includes at least two sensor modules.

The lighting module 100 and the sensor module 200 may communicate with each other by wire/wirelessly such that the sensor module 200 controls an on/off operation of the lighting module 100. For example, in the case of wireless communication, the sensor module 200 may directly control an operation of the lighting module 100 using ZigBee communication.

The remote controller 300 may remotely control the sensor module 200 through infrared communication or local area communication (WiFi, ZigBee, wireless USB, etc.).

Referring to FIGS. 2, 3A, 3B, and 4A to 4D, each sensor module 200 may include a PCB 210, a motion sensor 220 installed on a bottom surface of the PCB 210, an illumination sensor 230 installed on the bottom surface of the PCB 210, one pair of dual wireless transceivers 240 and 242 installed on a top or bottom surface of the PCB 210, one pair of wireless receivers 250 and 252 installed on the top or bottom surface of the PCB 210 toward a lateral surface thereof, a micro computer 260 installed on the top or bottom surface of the PCB 210, and a memory 270 installed on the top or bottom surface of the PCB 210.

Figure 2:
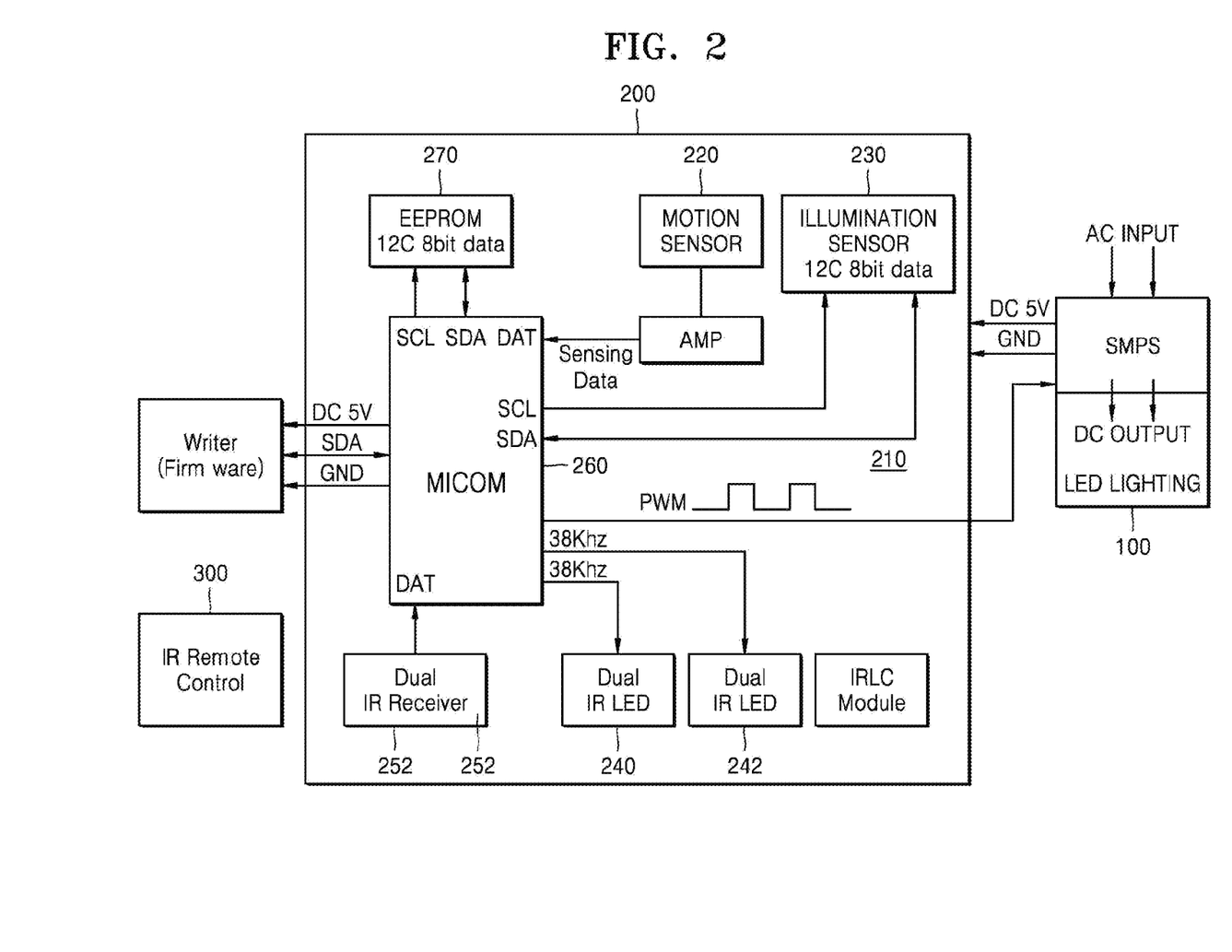
FIG. 2 is a block diagram of an infrared communication sensor module according to an embodiment of the present invention.
Figure 3A:
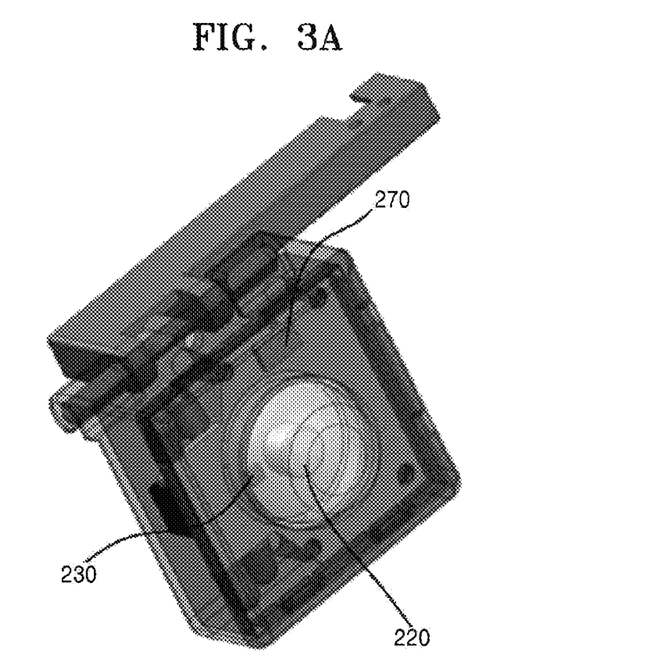
FIGS. 3A and 3B are a top perspective view and a bottom perspective view of a sensor module installed in a sensor frame according to an embodiment of the present invention, respectively.
Figure 3B:
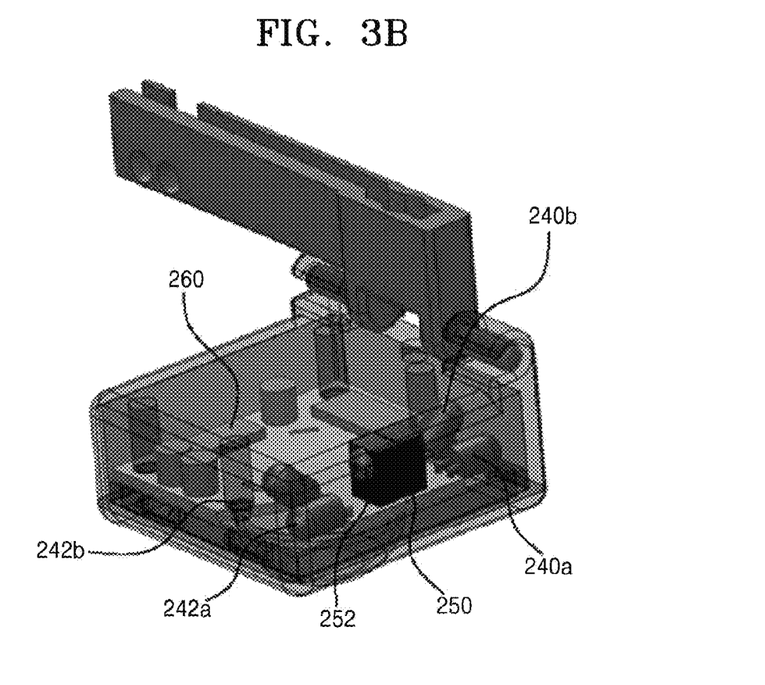
Figure 4A:
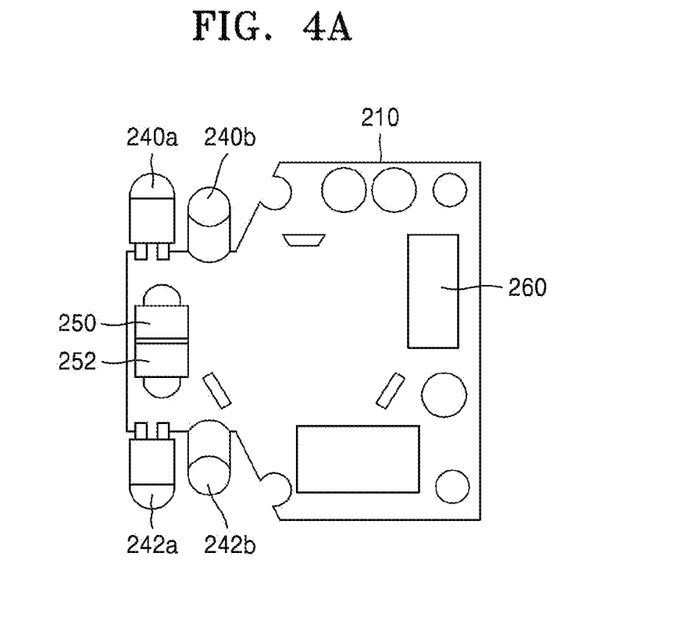
FIGS. 4A to 4D are a plan view, a bottom view, a left lateral view, and a right lateral view of a lighting module according to an embodiment of the present invention, respectively.
Figure 4B:
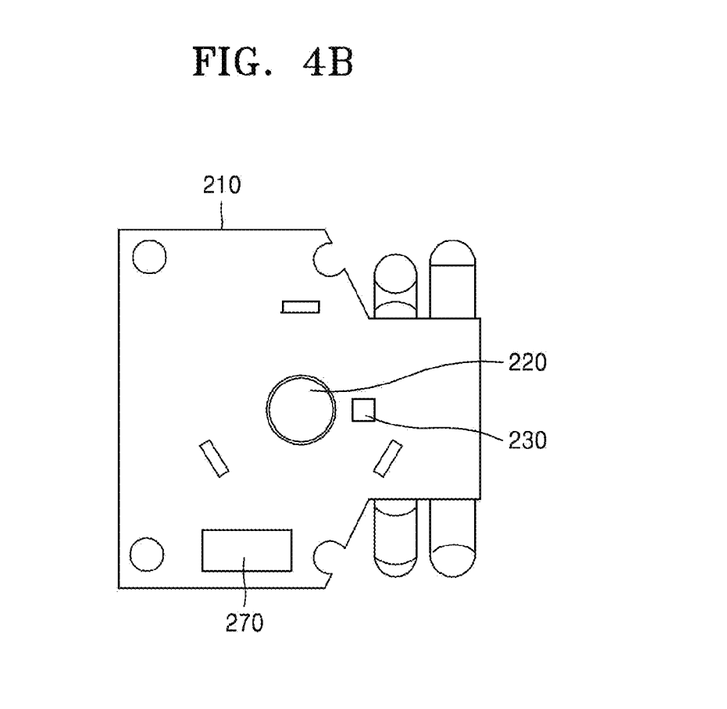
Figure 4C:
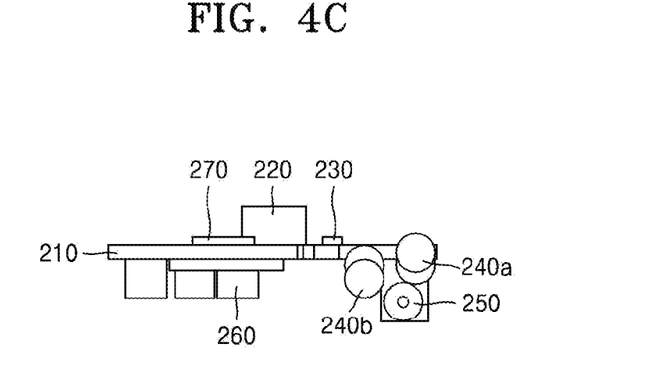
Figure 4D:
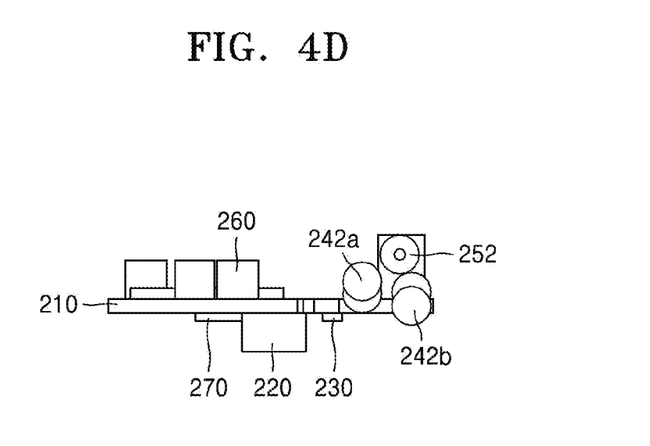

The motion sensor 220 may include a light sensor, a thermal sensor, a proximity sensor, and an infrared (IR) sensor. According to embodiments of the present invention, an IR sensor for detection of infrared rays during the nighttime is used. Accordingly, each sensor module 200 may detect a motion of a man, a car, and so on (hereinafter, referred to as M/C) via the motion sensor 220.

The illumination sensor 230 detects light. For example, the illumination sensor 230 may detect the amount of natural light. During the daytime, the lighting module 100 is not operated to prevent waste of power. Recommended illuminance may be set by the micro computer 260 and changed as necessary.

The micro computer 260 may turn off the lighting module 100 when there is no motion of M/C, may turn on the lighting module 100 only when there is a motion of M/C, re-turn off the lighting module 100 when a motion of M/C is not detected any more, and count on-operation time of the lighting module 100. The micro computer 260 may control the brightness of the lighting module 100. For example, during the on-operation time, the brightness of a lighting module may also be raised or lowered by stages. The micro computer 260 may adjust an operation condition of the lighting module 100. For example, even if there is no motion of M/C, the lighting module 100 may not be operated in a predetermined illumination or more and may be operated in a predetermined illumination or less.

The memory 270 may store the aforementioned recommended illuminance value, brightness information, counted value of operation time, and so on.

The wireless transceivers 240 and 242 may include an IR LED for transmitting an infrared (IR) signal. The wireless receivers 250 and 252 may include an IR signal receiving IC for reception of an IR signal.

According to embodiments of the present invention, the wireless transceivers 240 and 242 and the wireless receivers 250 and 252 bi-directionally and wirelessly communicate with the sensor modules 200a to 200d that neighbor the wireless transceivers 240 and 242 and the wireless receivers 250 and 252, and thus may be configured with one pair. In this case, one pair of wireless transceivers 240 and 242 may be disposed at both sides of one pair of receivers 250 and 252.

In addition, according to embodiments of the present invention, the wireless transceivers 240 and 242 may include dual transceivers 240a and 240b, and 242a and 242b, respectively. For example, when the wireless transceivers 240 and 242 include an IR LED, the IR LED may be installed to be tilted at 30° to 45° in up and down directions from a center based on a horizontal surface of the PCB 210. The dual transceivers (e.g., 240a and 240b) simultaneously transmit an IR signal.

Figure 5:
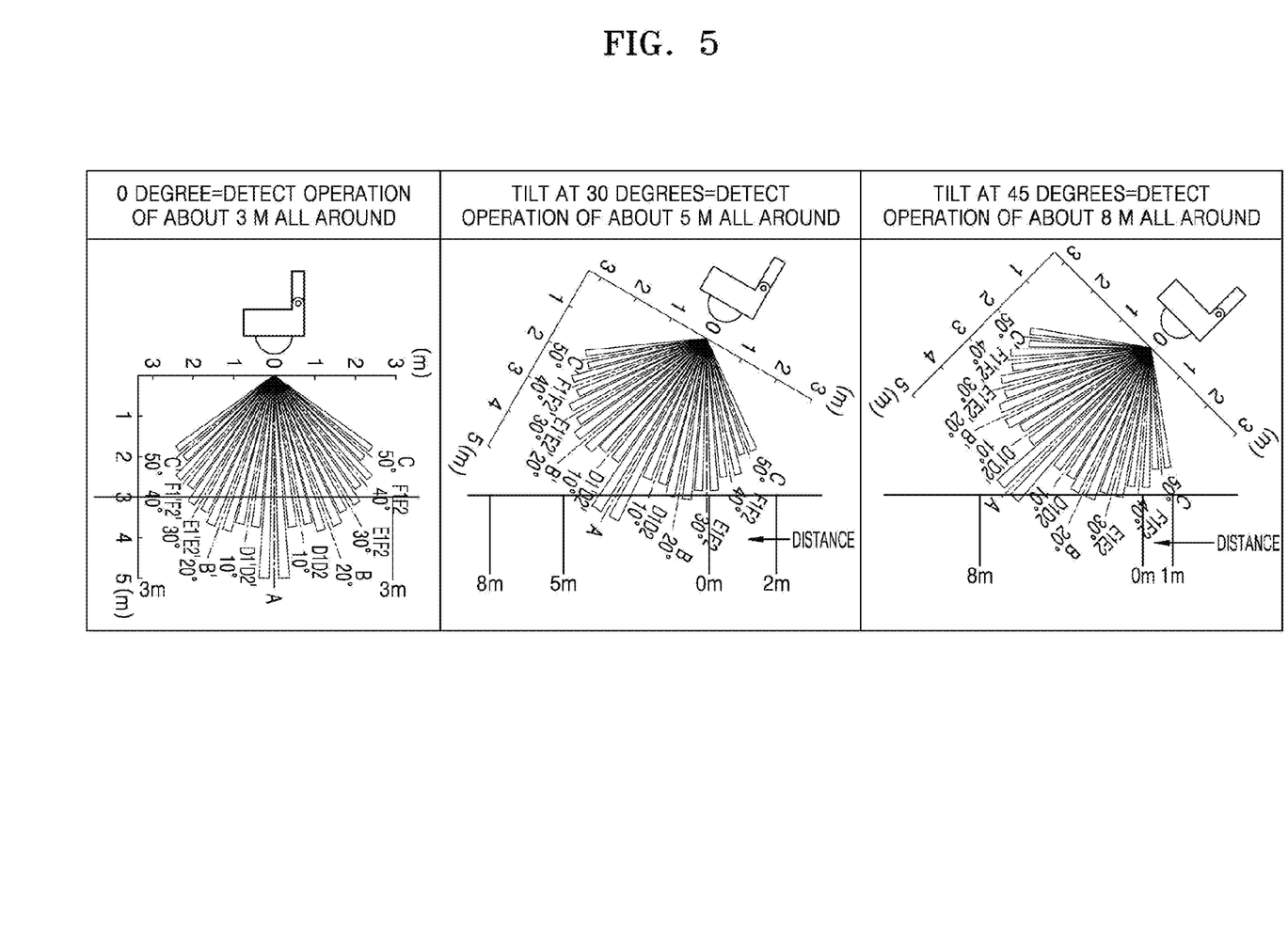
FIG. 5 is a diagram illustrating a concept of a degree of a distance for motion detection according to an angle of a sensor frame according to an embodiment of the present invention.

Referring to FIG. 5, a motion detection distance may be changed according to an angle of the sensor module 200. The first sensor module 200*a* and the fourth sensor module 200*d* that are installed at outermost portions are installed to be tilted at 30° to 45° based on the ground. When the first sensor module 200*a* is tilted and communicates with the second sensor module 200*b* that is not tilted, angles do not correspond to each other, and thus infrared communication may not be performed.

Figure 6:
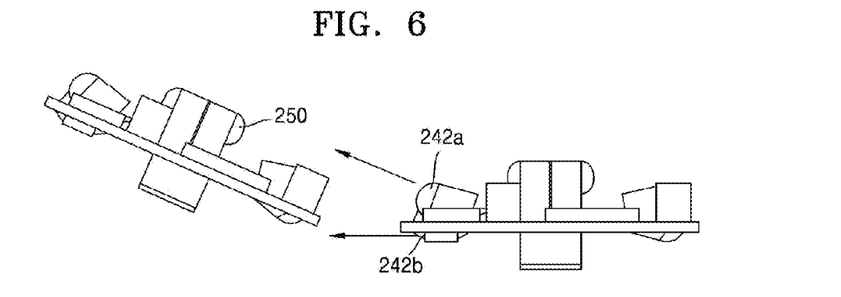
FIG. 6 is a diagram illustrating an example of an operation of an infrared LED that performs transmission and reception irrespective of an angle of a sensor frame according to an embodiment of the present invention.

Referring to FIG. 6, the wireless transceivers 240 and 242 of the first sensor module 200*a* may be installed as the dual transceivers 240*a* and 240*b*, and 242*a* and 242*b* and configured to transmit an infrared signal transmitted from the wireless transceiver 242*b* installed to be tilted at 30° to 45° toward an upper portion of the dual transceivers 240*a* and 240*b*, and 242*a* and 242*b* to the second sensor module 200*b* that is horizontally installed.

The remote controller 300 may remotely control the motion sensor 220, the illumination sensor 230, the micro computer 260, and so on. For example, when the motion sensor 220 detects M/C, the remote controller 300 may adjust time for turning on the lighting module 100 in the range of several seconds to several tens of seconds. In addition, continuously, when M/C is re-detected, the aforementioned operation time may be adjusted to be repeatedly added. When current brightness is detected as predetermined brightness or less by the illumination sensor 230, a condition for turning on the lighting module 100 may be adjusted. When infrared sensors are grouped, the number of the sensor module 200 included in the group may be adjusted. For example, the first and second sensor modules 200*a* and 200*b* may be set as one group and the third and fourth sensor modules 200*c* and 200*d* may be set as another group. Alternatively, the first to fourth sensor modules 200*a* to 200*d* may be set as one group.

Figure 7:
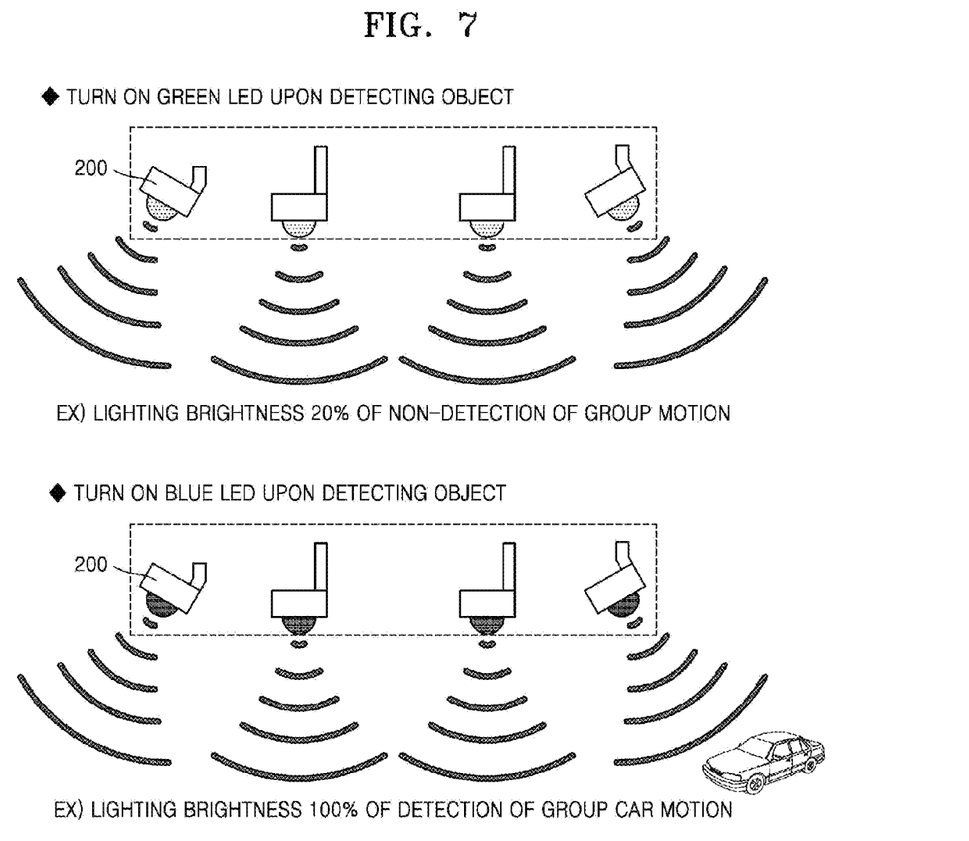
FIGS. 7 and 8 are diagrams of an example of use of an infrared communication sensor module according to an embodiment of the present invention.

Referring to FIG. 7, a color LED (not shown) for displaying whether sensing is achieved may be further installed in the sensor module 200. For example, a green LED installed on the PCB 210 may be used when a motion of M/C is not detected, and a blue LED may be used when a motion of M/C is detected. When the blue LED is operated and the motion of M/C is detected, if a lighting is not turned on, it may be easily determined that the lighting module 100 malfunctions. Movement and a unit of the sensor module 200 set as other groups may be easily checked with color.

Figure 8:
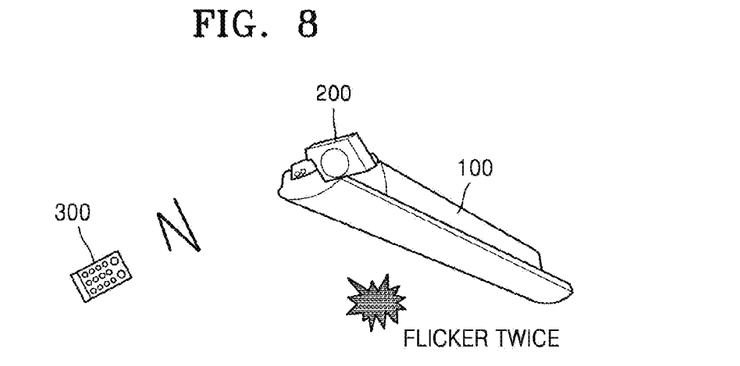

Referring to FIG. 8, when the sensor module 200 is controlled using the remote controller 300, the sensor module 200 may be flickered twice for three seconds using a separate display device when a desired mode is set or changed.

Hereinafter, a motion sensor network method for lighting in group units using an infrared communication sensor module will be described according to exemplary embodiments of the invention with reference to the attached drawings.

Figure 9:
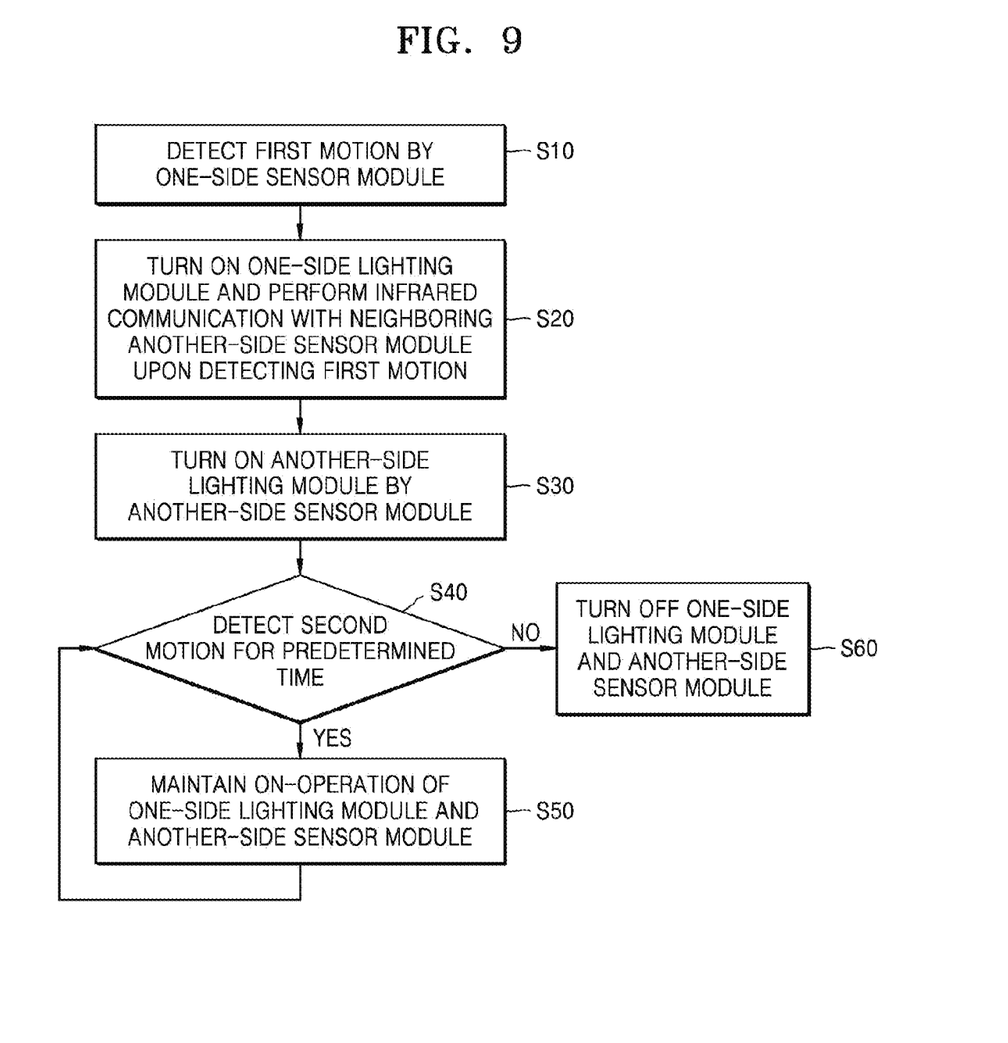
FIG. 9 is a flowchart of a motion sensor network method for lighting in group units using an infrared communication sensor module according to an embodiment of the present invention.

Referring to FIG. 9, a one-side sensor module (e.g., refer to 200*a* of FIG. 1) detects a first motion of M/C (S10). When the one-side sensor module detects the first motion of M/C, a one-side lighting module (e.g., refer to 100*a* of FIG. 1) is turned on and performs infrared communication with an another-side sensor module (refer to 200*b* of FIG. 1) that neighbors the one-side sensor module so as to turn on an another-side lighting module (e.g., 100*b* of FIGS. 1) (S20 and S30). The one-side sensor module or the another-side sensor module detects a second motion of M/C (S40). When the second motion is detected, the on-operation of the one-side lighting module and the another-side lighting module is maintained (S50). On the other hand, when the one-side sensor module or the another-side sensor module does not detect the second motion of M/C for predetermined time, the one-side lighting module and the another-side lighting module are turned off (S60).

By virtue of the network system 1000 according to embodiments of the present invention, the plurality of sensor modules 200*a* to 200*d* may be controlled in group units through wireless communication between the sensor modules 200*a* to 200*d*. The group includes at least two sensor modules. Different transmitting and receiving encryptions using a code may be set for respective groups. A transmitting and receiving encryption may be changed to control a group unit.

When the first to fourth sensor modules 200*a* to 200*d* are set as one group, if the first motion sensor 220 of the first sensor module 200*a* (or a fourth sensor module) installed at an outermost portion detects a motion of M/C in predetermined illumination or less, the first lighting module 100*a* is turned on, and simultaneously an operation signal is transmitted to the second wireless receivers 250 and 252 from the first wireless transceivers 240 and 242 to turn on the second lighting module 100*b*, an infrared signal is transmitted to the third wireless receivers 250 and 252 from the second wireless transceivers 240 and 242 to turn on the third lighting module 100*c*, and an operation signal is transmitted to the fourth wireless receivers 250 and 252 from the third wireless transceivers 240 and 242 to turn on the fourth lighting module 100*d*.

When M/C is not re-detected for predetermined time, the first to fourth lighting modules 100*a* to 100*d* are automatically turned off. In addition, when at least one of the sensor modules 200*a* to 200*d* in a group re-detects M/C, the sensor modules 200*a* to 200*d* are reset to further turn on the lighting modules 100*a* to 100*d* for predetermined time.

In addition, modules in the same group may also be set to be sequentially operated in relay. For example, upon detecting a motion of M/C using the first motion sensor 220, the first sensor module 200*a* transmits an infrared signal to the first wireless transceivers 240 and 242. The signal transmitted to the first wireless transceivers 240 and 242 may be transmitted to the second wireless receivers 250 and 252 that neighbor the first wireless transceivers 240 and 242 at a predetermined distance such that the second lighting module 100*b* and the first lighting module 100*a* are turned on in relay. M/C may be expected to be moved toward the second lighting module 200*b* so as to turn on the second lighting module 200*b*. Similarly, when M/C passes the second lighting module 200*b* as expected, the second lighting module 200*b* may detect a motion of M/C using the second motion sensor 220 of the second lighting module 200*b*, and thus the on-operation of the second lighting module 100*b* is maintained. Simultaneously, an infrared signal is transmitted to the second wireless transceivers 240 and 242, a signal transmitted from the second wireless transceivers 240 and 242 is transmitted to the third wireless receivers 250 and 252 that neighbor the second wireless transceivers 240 and 242, and the third lighting module 100*c* and the second lighting module 100*b* are turned on in relay.

As a result, the second sensor module 200*b* is turned on when receiving an infrared signal from the first sensor module 200*a* that neighbors the second sensor module 200*b* or detecting a motion of M/C through the motion sensor 220 of the second sensor module 200*b*. In addition, the second sensor module 200*b* may be repeatedly maintained to be turned on when receiving an infrared signal from the first sensor module 200*a* that neighbors the second sensor module 200b or detecting a motion of M/C through the motion sensor 220 of the second sensor module 200b.

For the case in which the lighting module 100 detects a motion of M/C through the motion sensor 220 of a corresponding sensor module and the case in which the lighting module 100 detects a motion of M/C through the motion sensor 220 that neighbors the corresponding sensor module, lighting brightness of the lighting module 100 may be differently set. For example, the lighting module 100 may be controlled to be lighter in the former case than in the latter case.

As described above, the technological idea is also applied to the feature of turning on a one-side lighting module and an another-side lighting module that are set as one group when the neighboring another-side sensor module detects a motion of M/C as well as when the one-side sensor module detects a motion of M/C. It will be apparent to those skilled in the art that various modifications and variations can be made in the present invention without departing from the spirit or scope of the invention.

The invention claimed is:

1. A motion sensor network system for lighting in group units using an infrared communication sensor, the motion sensor network system comprising:
    a plurality of lighting modules;
    a plurality of sensor modules corresponding to the respective lighting modules and for controlling an on/off operation of the lighting modules,
    wherein:
    the sensor modules control operations of the lighting modules through wireless communication between the sensor modules in group units;
    a group unit comprises at least two lighting modules;
    outermost sensor modules among the plurality of sensor modules are installed to be tilted at 30° to 45° in up and down direction from a center with respect to the ground; and
    the sensor modules except the outermost sensor modules are installed to orthogonally face the ground,
    wherein:
    each of the sensor module comprises:
    a printed circuit board;
    a pair of wireless receiver; and
    two pairs of wireless transceivers, a first pair of the wireless transceivers being disposed on a side of the pair of the wireless receivers and a second pair of the wireless transceivers being disposed on the other side of the pair of the wireless receivers,
    wherein:
    a first wireless transceiver of each pair of the wireless transceivers is installed to be horizontal to the printed circuit board and a second wireless transceiver of each pair of the wireless transceivers is installed to be tilted at 30° to 45° in up direction with respect to the printed circuit board;
    the first wireless transceiver wirelessly communicates with the wireless receiver in a case in which a wireless communication between the sensor modules orthogonally facing the ground is performed, and the second wireless transceiver wirelessly communicates with the wireless receiver in a case in which a wireless communication between the sensor module tilted to the ground and the sensor module orthogonally facing the ground is performed.

2. The method according to claim 1, wherein a one-side lighting module is turned on for predetermined time when a motion of a man or a car is detected by a one-side sensor module or is detected by a neighboring another-side sensor module.

3. The method according to claim 2, wherein:
    the one-side lighting module is maintained to be turned on for predetermined time in a case in which the one-side sensor module detects the motion of the man or the car or in a case in which the neighboring another-side sensor module detects the motion of the man or the car; and
    lighting brightness in the former case and lighting brightness in the latter case are set to be different.

4. The method according to claim 1, further comprising a remote controller for remotely controlling setting and change of the number of the sensor module in the group units via a non-contact method through infrared communication or local area communication with the sensor module.

* * * * *